(12) United States Patent
Uno

(10) Patent No.: US 8,646,353 B2
(45) Date of Patent: Feb. 11, 2014

(54) BICYCLE BRAKE OPERATING DEVICE

(75) Inventor: Kouji Uno, Osaka (JP)

(73) Assignee: Shimano Inc., Osaka (JP)

( * ) Notice: Subject to any disclaimer, the term of this patent is extended or adjusted under 35 U.S.C. 154(b) by 606 days.

(21) Appl. No.: 12/668,663

(22) PCT Filed: Jul. 10, 2008

(86) PCT No.: PCT/JP2008/001848
§ 371 (c)(1),
(2), (4) Date: Jan. 12, 2010

(87) PCT Pub. No.: WO2009/011110
PCT Pub. Date: Jan. 22, 2009

(65) Prior Publication Data
US 2010/0199798 A1 Aug. 12, 2010

(30) Foreign Application Priority Data

Jul. 14, 2007 (JP) .................................. 2007-185108
Oct. 15, 2007 (JP) .................................. 2007-267452

(51) Int. Cl.
*B62M 25/08* (2006.01)
*B62K 23/04* (2006.01)

(52) U.S. Cl.
USPC ....... 74/473.12; 74/488; 74/502.2; 188/24.11

(58) Field of Classification Search
USPC ........... 74/473.12, 473.14, 502.2, 489, 501.6; 188/24.22, 344, 24.11; 200/61.87, 200/61.88
IPC ............................................ B62M 25/04,25/08
See application file for complete search history.

(56) References Cited

U.S. PATENT DOCUMENTS

| 4,100,820 | A | | 7/1978 | Evett | |
|---|---|---|---|---|---|
| 4,143,557 | A | * | 3/1979 | Wakebe et al. | ................. 474/80 |
| 4,945,785 | A | * | 8/1990 | Romano | ..................... 74/502.2 |
| 6,031,190 | A | * | 2/2000 | Tokuda et al. | ............. 200/11 R |
| 6,042,132 | A | * | 3/2000 | Suenaga et al. | ............... 280/260 |
| 6,698,307 | B2 | * | 3/2004 | Wesling et al. | ............ 74/473.13 |
| 7,007,785 | B2 | * | 3/2006 | Uno et al. | ..................... 192/217 |
| 2005/0016312 | A1 | | 1/2005 | Dal Pra' | |
| 2005/0160870 | A1 | * | 7/2005 | Barnett | .......................... 74/523 |
| 2005/0211014 | A1 | | 9/2005 | Fujii | |
| 2007/0175290 | A1 | * | 8/2007 | Fujii | ............................ 74/502.2 |
| 2008/0115616 | A1 | * | 5/2008 | Chiang | ....................... 74/502.2 |

FOREIGN PATENT DOCUMENTS

| DE | 41 38 311 A1 | 5/1992 |
|---|---|---|
| DE | 602 00 771 T2 | 8/2005 |
| JP | 05-97088 A | 4/1993 |
| JP | 05-286476 A | 11/1993 |

(Continued)

OTHER PUBLICATIONS

Office Action of corresponding German Application No. 11 2008 001 717.4 dated Jul. 15, 2011.

*Primary Examiner* — Richard W Ridley
*Assistant Examiner* — Thomas Diaz
(74) *Attorney, Agent, or Firm* — Global IP Counselors

(57) ABSTRACT

A bicycle brake operating device is provided with a handlebar bracket, a brake lever, an operation unit and a detection device. Rotation of the operation unit is detected by the detection device. The operation unit is arranged so that it does not readily hinder a braking operation. The operation unit also arranged so that it us not readily damaged when the bicycle falls over.

16 Claims, 3 Drawing Sheets

(56) References Cited

FOREIGN PATENT DOCUMENTS

| | | |
|---|---|---|
| JP | 10-194188 A | 7/1998 |
| JP | 10-230888 A | 9/1998 |
| JP | 11-245873 A | 9/1999 |
| JP | 2003-40187 A | 2/2003 |
| JP | 2003-48593 A | 2/2003 |
| JP | 2005-153864 A | 6/2005 |
| JP | 2005-153865 A | 6/2005 |
| JP | 2006-7841 A | 1/2006 |
| JP | 2006-123898 A | 5/2006 |
| JP | 2006-137206 A | 6/2006 |
| JP | 2007-137412 A | 6/2007 |

* cited by examiner

BICYCLE BRAKE OPERATING DEVICE

CROSS-REFERENCE TO RELATED APPLICATIONS

This U.S. National stage application claims priority under 35 U.S.C. §119(a) to Japanese Patent Application Nos. 2007-185108, filed in Japan on Jul. 14, 2007, and 2007-267452, filed in Japan on Oct. 15, 2007, the entire contents of which are hereby incorporated herein by reference.

TECHNICAL FIELD

The present invention relates to a device for operating a bicycle brake.

BACKGROUND ART

One of the conventional bicycle brake operating devices has a rim brake caliper, a disc brake caliper, or the like operated via a brake wire configured from an outer casing and an inner wire, as in the embodiments disclosed in Japanese Laid-open Patent Application Nos. 05-286476, 2005-153864 and 05-097088.

Another conventional device has a rim brake caliper, a disc brake caliper, or the like operated via a brake hose filled with a liquid, as in the embodiment disclosed in Japanese Laid-Open Patent Application No. 2006-123898.

In the devices of Japanese Laid-Open Patent Application Nos. 05-286476, 2005-153864, 05-097088 and 2006-123898, it is possible for a gear shifter to be operated via a shift wire configured from an outer casing and an inner wire.

Another bicycle brake operating device is to detect the rotation of an operating unit capable of rotating around an axis that is both substantially perpendicular to an axis in the swinging center of a brake lever and substantially perpendicular to the longitudinal direction of the brake lever, and to enable outputting of an electric signal, as is disclosed in Japanese Laid-Open Patent Application Nos. 10-230888 and 2007-137412.

Japanese Laid-Open Patent Application No. 2007-137412 discloses an embodiment in which operating units are installed on both a brake lever and a bracket.

One of the conventional gear shifter operation devices for bicycles involves the gear shifter being operated via a shift hose filled with a liquid as in the embodiment disclosed in Japanese Laid-Open Patent Application No. 2003-048593, and another conventional device involves the gear shifter being operated via a shift hose filled with a gas as in the embodiment disclosed in Japanese Laid-Open Patent Application No. 11-245873.

One of the conventional electric gear shifters for bicycles involves an external gear shifter being controlled as in the embodiment disclosed in Japanese Laid-Open Patent Application Nos. 2006-137206 and 2006-007841, and another conventional shifter involves an internal gear shifter being controlled as in Japanese Laid-Open Patent Application No. 2003-040187.

Japanese Laid-Open Patent Application Nos. 05-286476, 2005-153864, 05-097088, 2006-123898, 10-230888, 2007-137412, 2003-048593 and 11-245873 disclose signal output means for controlling a gear shifter, wherein the means in Japanese Laid-Open Patent Application Nos. 05-286476, 2005-153864, 05-097088 and 2006-123898 is that the signal output be made by a wire; in Japanese Laid-Open Patent Application Nos. 10-230888 and 2007-137412, by electricity; in Japanese Laid-Open Patent Application No. 2003-048593, by a liquid; and in Japanese Laid-Open Patent Application No. 11-245873, by a gas.

SUMMARY

Problems the Invention is Intended to Solve

There is a demand for a bicycle brake operating device comprising an operating unit capable of detecting rotation by detection means, wherein the operating unit does not readily hinder the braking operation, the operating unit is not readily damaged when the bicycle falls over, the feel and efficiency of the operation do not readily change despite differences in the operating position or the size of the hands of the rider, and the operation unit is easily designed to be dustproof and waterproof.

Means for Solving the Problems

The following description uses drawings and the like pertaining to embodiments of the present invention, which are intended to make the details of the present invention easier to understand, and are not intended to limit the accompanying claims.

The words "front," "back," "right," "left," and "down" used below refer to a bicycle traveling stably and straight over a horizontal surface. For example, the term "forward" refers to the direction in which the bicycle travels forward.

First, a simple description is given, using FIG. 1 or 4, of the peripheral vicinity of a typical bicycle handlebar. In a dropped handlebar 1, a center part 16 is clamped onto a front end part 17 of a handlebar post 18, one end 14 curves to the rear, and a band 8 of a bracket 2 is wound around the curved portion, fixing the bracket 2 to face forward. The other end of the handlebar 1 has a mirror image correlation with the one end 14, and is therefore not described in FIGS. 1 through 6. The handlebar post 18 is connected to a steering tube, and the steering tube is inserted through a head tube 20 of the bicycle frame and supported by a bearing 19 to be capable of rotating relative to the head tube 20.

The bicycle brake operating device according to a first aspect is, as shown collectively in FIGS. 1 through 3 or collectively in FIGS. 4 through 6, for example, a bicycle brake operating device comprising:

a bracket 2 capable of being fixed to a handlebar 1 of a bicycle;

a brake lever 4 supported on the bracket 2 so as to be capable of swinging around an axis 3 of the bracket 2;

an operation unit 6 supported on the brake lever 4 so as to be capable of rotating around an axis 5 extending in the longitudinal direction of the brake lever 4; and detection means 7 capable of detecting the rotation of the operation unit 6 centered around the axis 5.

The bicycle brake operating device according to a second aspect is, as shown collectively in FIGS. 1 through 3 or collectively in FIGS. 4 through 6, for example, a bicycle brake operating device comprising:

a bracket 2 capable of being fixed to a handlebar 1 of a bicycle;

a brake lever 4 supported on the bracket 2 so as to be capable of swinging around an axis 3 disposed on the bracket 2;

an operation unit 6 supported on the brake lever 4 so as to be capable of rotating around an axis 5 forming any angle within 30 degrees with respect to the longitudinal direction of the brake lever 4; and detection means 7 capable of detecting the rotation of the operation unit 6 centered around the axis 5.

The bicycle brake operating device according to a third aspect is, as shown collectively in FIGS. 1 through 3 or collectively in FIGS. 4 through 6, for example, a bicycle brake operating device comprising:

a bracket 2 capable of being fixed to a handlebar 1 of a bicycle;

a brake lever 4 supported on the bracket 2 so as to be capable of swinging around an axis 3 disposed on the bracket 2;

an operation unit 6 supported so as to be capable of rotating around an axis 5 extending in the longitudinal direction of the brake lever 4; and detection means 7 capable of detecting the rotation of the operation unit 6 centered around the axis 5; wherein the axis 5 is between the brake lever 4 and the handlebar 1 when the bracket 2 has been fixed to the handlebar 1 and the brake lever 4 is in a standby mode preceding operation.

The bicycle brake operating device according to a fourth aspect is, as shown collectively in FIGS. 1 through 3 or collectively in FIGS. 4 through 6, for example, a bicycle brake operating device comprising:

a bracket 2 capable of being fixed to a handlebar 1 of a bicycle;

a brake lever 4 supported on the bracket 2 so as to be capable of swinging around an axis 3 of the bracket 2;

an operation unit 6 supported on the brake lever 4 so as to be capable of rotating around an axis 5 forming any angle within 30 degrees with respect to the longitudinal direction of the brake lever 4; and detection means 7 capable of detecting the rotation of the operation unit 6 centered around the axis 5; wherein the axis 5 is between the brake lever 4 and the handlebar 1 when the bracket 2 has been fixed to the handlebar 1 and the brake lever 4 is in a standby mode preceding operation.

The bicycle brake operating device according to a fifth aspect is the bicycle brake operating device according to any of the first through fourth aspects, as shown collectively in FIGS. 1 through 3 or collectively in FIGS. 4 through 6, for example, wherein the longitudinal direction of the operation unit 6 extends in the longitudinal direction of the brake lever 4.

The bicycle brake operating device according to a sixth aspect is the bicycle brake operating device according to any of the first through fourth aspects, as shown collectively in FIGS. 1 through 3 or collectively in FIGS. 4 through 6, for example, wherein the longitudinal direction of the operation unit 6 extends along the axis 5.

The bicycle brake operating device according to a seventh aspect is the bicycle brake operating device according to any of the first through fourth aspects, wherein the operation unit 6 is used to operate a gear shifter of the bicycle.

The bicycle brake operating device according to an eighth aspect is the bicycle brake operating device according to any of the first through fourth aspects, wherein the operation unit 6 is used to operate a gear shifter of the bicycle; and the gear shifter of the bicycle uses a voltage source, an air pressure source, or the like as a power source.

Effect of the Invention

In the present invention as described above, since the amount by which the operation unit 6 protrudes from the brake lever 4 is small, a sufficient swinging range can be ensured for the brake lever 4 without readily hindering the braking operation, and the operation unit 6 is not readily damaged when the bicycle falls over. Furthermore, since the operation unit 6 undergoes rotational movement centered around the axis 5, the feel of the operation is stabilized because the force required for the operation is small and readily stabilized in comparison to an operation unit that undergoes linear movement, and a seal centered around the axis 5 is readily provided in cases in which dustproofing or waterproofing is required.

According to the first or second aspect, in addition to the effects of the present invention, the operation unit 6 can be supported by a comparatively simple structure.

According to the third or fourth aspect, in addition to the effects of the present invention, the operation unit 6 is even less readily damaged because the operation unit 6 is protected by the brake lever 4 and the handlebar 1.

According to the fifth or sixth aspect, in addition to the effects of the present invention, it is possible to adapt more easily to differences in the operating position or the size of the hands of the rider even if a plurality of operating units is not disposed, and a stable feeling of operation is obtained at various operation positions because the distance from the axis 5 is comparatively stable when operating any portion of the operation unit 6, in comparison with a conventional operation unit made to extend far in a direction substantially perpendicular to the swinging center axis.

According to the seventh or eighth aspect, in addition to the effects of the present invention, it is easy to collectively perform a series of operations of the bicycle, such as a deceleration braking operation and a downshifting operation, for example.

According to the eighth aspect, in addition to the effects of the present invention, it is easy to minimize the length of the operation unit 6 in a direction perpendicular to the axis 5 because only a comparatively small amount of energy is needed to operate the operation unit 6.

DETAILED DESCRIPTION OF EMBODIMENTS

Figure 1:
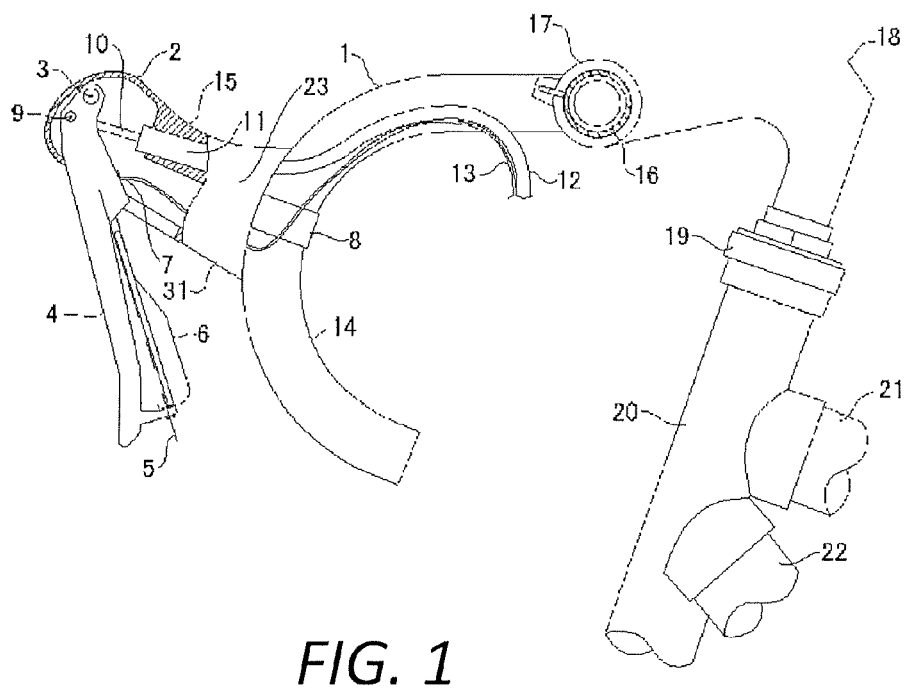
FIG. 1 is a broken-out cross-sectional view of the bracket 2, depicting Embodiment 1 as seen from the left side of the fixed handlebar 1.

The bicycle brake operating device of Embodiment 1 described below can be converted to a wire model as in Embodiment 2, and the bicycle brake operating device of Embodiment 2 can be converted to a hydraulic model as in Embodiment 1.

In Embodiment 1 or 2 described below, the operation unit 6 is rotatable around the axis 5, and its rotatable range is limited. However, one or more rotations of the operation unit 6 become possible by reducing the size of the fin shapes 25 to 27, thereby enabling the operation unit 6 to detect the rotation by a rotary encoder and to output an electric signal.

In Embodiment 1 or 2 described below, instead of rotation using a shaft shape 29, a so-called pivotless structure may be used in which, e.g., the operation unit 6 and the brake lever 4 are integrally molded using a fiber-reinforced resin, only the portion through which the axis 5 passes is molded thinly, and the operation unit 6 is capable of rotating only at a slight angle.

In Embodiment 1 or 2 described below, electric signals can be outputted for both upshifting and downshifting, but, e.g., the operation unit 34 of Embodiment 2 may be omitted. In this case, possibilities include, but are not limited to, determining that upshifting or downshifting has occurred by a single click or double click of the operation unit 6, and providing another operation unit on, e.g., the left side surface 23 of the bracket 2.

In Embodiment 1 or 2 described below, instead of a switch that directly moves the point of contact, various conventional detection means can be used, including, but not limited to, a lead switch and magnet, a phototransistor or other optical sensor and slit, or a Hall element or other magnetic sensor and magnet.

In Embodiment 1 or 2 described below, instead of a wired design that uses a signal wire 13, the signals may be wireless means. In this case, the bracket 2 may be equipped with a control board, antenna, and a battery for outputting carrier waves modulated by electric signals from the detection means or detection device 7, for example.

In Embodiment 1 or 2 described below, instead of the gear shifter of the bicycle being controlled, the headlight, blinker, horn, speedometer, or the like may be controlled.

In Embodiment 1 or 2 described below, the bracket 2 may be fixed to the handlebar 1 by integrally molding the handlebar 1 and the bracket 2 from a carbon sheet or the like, for example.

In Embodiment 1 or 2 described below, instead of the detection means or detection device 7 which is an electrical switch, possibilities include, e.g., detecting the rotation of the operation unit 6 by a pawl and ratchet as in the embodiment in Japanese Laid-Open Patent Application No. 2005-153864, and detecting the rotation of the operation unit 6 by a gas control valve as in the embodiment in Japanese Laid-Open Patent Application No. 11-245873.

In Embodiment 1 described below, instead of the operation unit 6 being supported on the brake lever 4, a possible configuration is one in which the operation unit 6 is supported on a member supported on the bracket 2 so as to be capable of swinging around an axis substantially parallel to the axis 3, and the operation unit 6 is supported on the bracket 2 so as to be capable of substantially rotating around the axis 5. In this case, the configuration and arrangements are preferably designed so that the operation unit 6 follows the swinging operation of the brake lever 4, as in the embodiment of Japanese Laid-Open Patent Application No. 05-097088.

In Embodiment 1 or 2 described below, extending the fin shape 27 or 38 to the vicinity of the axis 3 makes it possible to easily operate the operation unit 6 or 34 with the thumb, index finger, or another finger even in an operating position where the front end vicinity of the bracket 2 is grasped.

Embodiment 1

Figure 2:
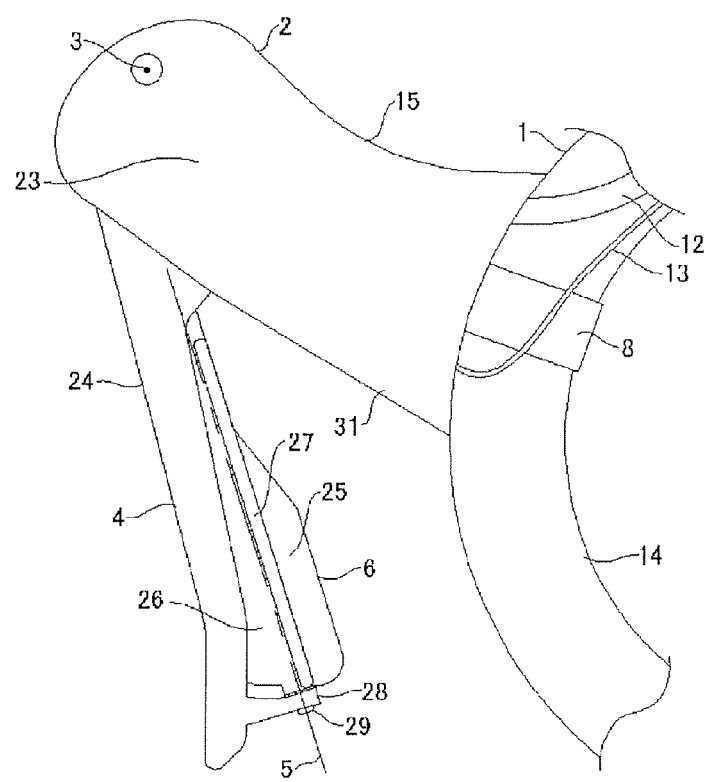
FIG. 2 is a view of Embodiment 1 as seen from the left side.
Figure 3:
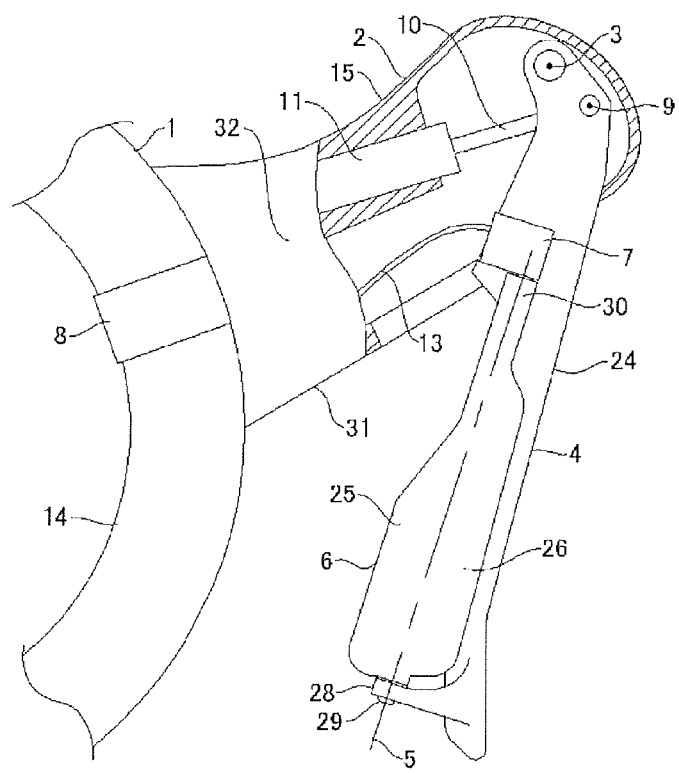
FIG. 3 is a broken-out cross-sectional view of the bracket 2, depicting Embodiment 1 as seen from the right side.

In FIGS. 1 through 3, the brake lever 4 has a rod shape extending downward, one end of which is supported on a shaft pin centered around an axis 3 disposed in the front end of a hollow rod-shaped bracket 2. The other end of the brake lever 4 in standby mode is swung backward, thereby causing one end of a push rod 10 to push on the internal cylinder of a hydraulic cylinder 11, the other end of the push rod 10 being connected to a shaft pin centered around an axis 9 parallel to the axis 3 and disposed in the center of the brake lever 4. The internal pressure increases in a brake hose, which is a linking member 12 connected at one end to the hydraulic cylinder 11, and a hydraulic brake caliper connected to the other end of the linking member 12 begins a braking action.

Typical operation positions include a position wherein the bases of the thumb and index finger of the right hand, the middle of the thumb, and the middle of the index finger come in contact with the top surface 15, the left side surface 23, and the right side surface 32 of the bracket 2, respectively; and a position where the one end 14 of the handlebar 1 is grasped by the right hand. In either operation position, the front surface 24 of the brake lever 4 can be hooked by the index finger.

The rod-shaped operation unit 6 extends along the back surface of the brake lever 4 and is capable of rotating around the axis 5 disposed so as to form an angle of 30 degrees or less with the longitudinal direction of the brake lever 4 (if the angle formed is 30 degrees or less, the axis 5 can be said to extend sufficiently along the longitudinal direction of the brake lever 4). The rod-shaped operation unit 6 comprises a shaft shape 29 centered around the axis 5 at one end, a cylindrical shape centered around the axis 5 at the other end, and fin shapes 25 to 27 extending along the axis 5 to the rear, front, and left of the axis 5, respectively. The cylinder shape 30 at the other end is non-rotatably connected to an input shaft of the detection means 7 placed in the middle of the brake lever 4, and is thus rotatably supported on the brake lever 4. The shaft shape 29 is rotatably supported on a support part 28 at the other end of the brake lever 4.

The detection means 7 is a switch comprising an urging member for returning the input shaft centered around the axis 5 to a neutral position; and a mechanism which causes first and second terminals to close by rotating them about 5 degrees in a forward direction from the neutral position, and which causes second and third terminals to close by rotating them about 5 degrees in a reverse direction. The first, second, and third terminals are electrically connected to three cores of the signal wire 13, and are electrically connected by the signal wire 13 to a gearshift control board installed on the bicycle frame. The gearshift control board monitors which of the first and third terminals the second terminal closes with, and controls an actuator for the gear shifting action so that if one terminal closes, the gear shifts up, and if the other terminal closes, the gear shifts down. The operation unit 6 can only rotate about 10 degrees in the forward and reverse directions from the neutral position because the fin shapes 26 and 27 both come in contact with the brake lever 4.

Though not shown in FIGS. 1 through 3, a bicycle brake operating device, being a mirror image of the first device, is fixed to the other end of the handlebar 1 and can be operated by the left hand.

Embodiment 2

Figure 4:
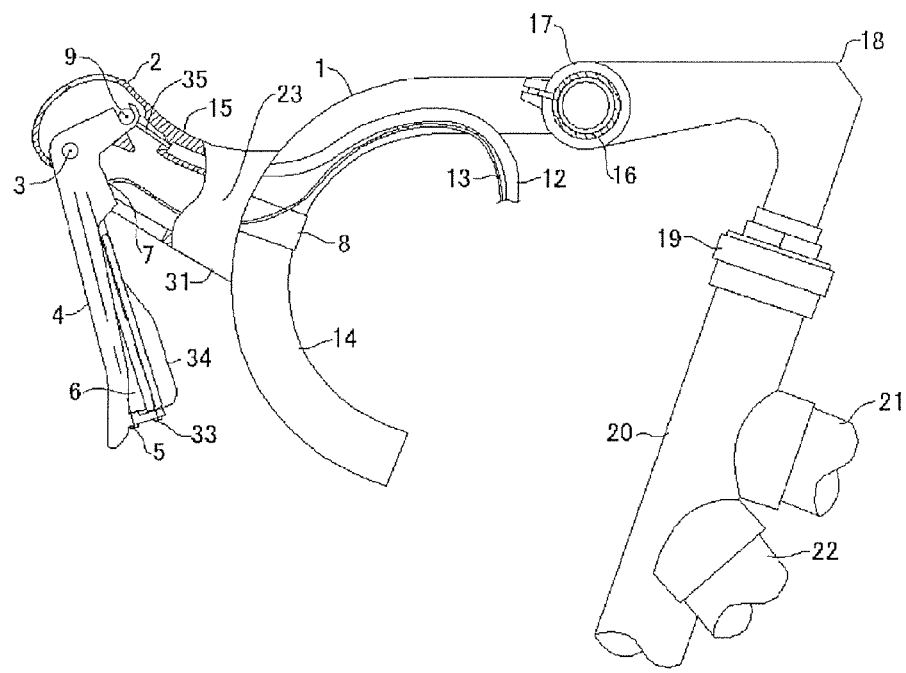
FIG. 4 is a broken-out cross-sectional view of the bracket 2, depicting Embodiment 2 as seen from the left side of the fixed handlebar 1.
Figure 5:
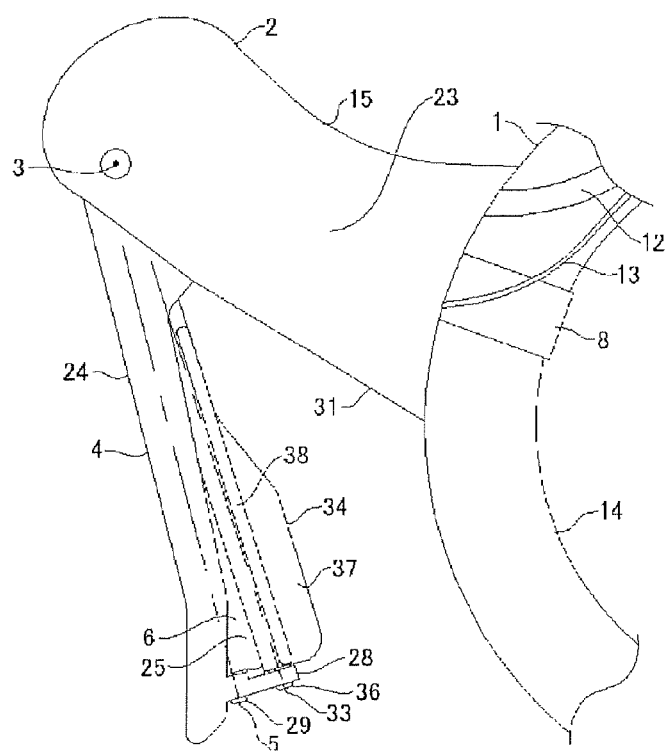
FIG. 5 is a view of Embodiment 2 as seen from the left side.
Figure 6:
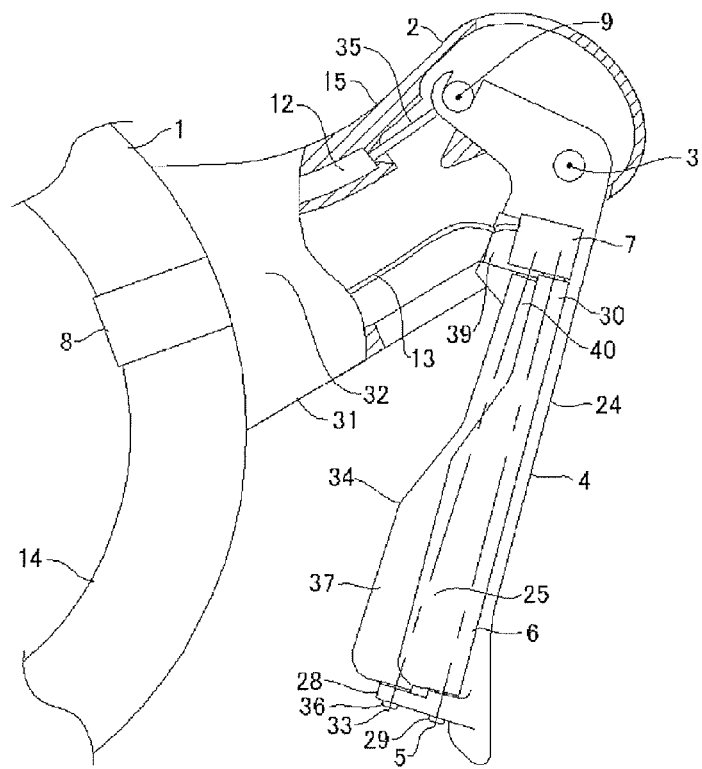
FIG. 6 is a broken-out cross-sectional view of the bracket 2, depicting Embodiment 2 as seen from the right side.

In FIGS. 4 through 6, the brake lever 4 has a rod shape extending downward, the middle of which is supported on a shaft pin centered around an axis 3 disposed in the front end of a hollow rod-shaped bracket 2. The other end of the brake lever 4 in standby mode is swung backward, thereby causing an inner wire 35 to be pulled out from an outer casing. One end of the inner wire 35 is connected to a shaft pin centered around an axis 9 parallel to the axis 3 and disposed in the center of the brake lever 4. The outer casing is a linking member 12 interlocked at one end with the bracket 2. A wired brake caliper, to which the other end of the linking member 12 is interlocked and the other end of the inner wire 35 is connected, begins a braking action.

Typical operation positions include a position wherein the bases of the thumb and index finger of the right hand, the middle of the thumb, and the middle of the index finger come in contact with the top surface 15, the left side surface 23, and the right side surface 32 of the bracket 2, respectively; and a position where the one end 14 of the handlebar 1 is grasped by the right hand. In either operation position, the front surface 24 of the brake lever 4 can be hooked by the index finger.

The rod-shaped operation unit 6 extends along the back surface of the brake lever 4 and is capable of rotating around the axis 5 disposed so as to form an angle of 30 degrees or less with the longitudinal direction of the brake lever 4. The rod-shaped operational unit 6 comprises a shaft shape 29 centered around the axis 5 at one end, a cylindrical shape 30 centered around the axis 5 at the other end, and a fin shape 25 located behind the axis 5 so as to extend along the axis 5. The cylinder shape 30 is non-rotatably connected to an input shaft of the detection means 7 placed in the middle of the brake lever 4, and is thus rotatably supported on the brake lever 4. The shaft shape 29 is rotatably supported on a support part 28 at the other end of the brake lever 4.

A rod-shaped operation unit 34 extends along the back surface of the brake lever 4 and is capable of rotating around an axis 33 disposed behind the axis 5 so as to form an angle of 30 degrees or less with the longitudinal direction of the brake lever 4. The rod-shaped operation unit 34 comprises a shaft shape 36 centered around an axis 33 at one end, a cylindrical shape 40 centered around the axis 33 at the other end, and fin shapes 37 and 38 located to the rear and left of the axis 33, respectively. The cylindrical shape 40 at the other end is non-rotatably connected to an input shaft of detection means 39 placed in the middle of the brake lever 4, and is thus rotatably supported on the brake lever 4. The shaft shape 36 is rotatably supported on the support part 28 at the other end of the brake lever 4.

The detection means 7 is a switch comprising an urging member for returning the input shaft centered around the axis 5 to an initial position, and a mechanism whereby a rotation of approximately 5 degrees from the initial position causes first and second terminals to close. The detection means 39 is a switch comprising an urging member for returning the input shaft centered around the axis 33 to a neutral position; and a mechanism whereby a rotation of about 5 degrees in a forward direction from the neutral position causes third and fourth terminals to close, and a rotation of about 5 degrees in a reverse direction causes fourth and fifth terminals to close. The first and third terminals are electrically connected to each other, the second and fourth terminals are electrically connected to each other; and the third, fourth, and fifth terminals are electrically connected to three cores of the signal wire 13, and these terminals are electrically connected by the signal wire 13 to a gearshift control board installed on the bicycle frame. The gearshift control board monitors which of the third and fifth terminals the fourth terminal closes with, and controls an actuator for the gear shifting action so that if one terminal closes, the gear shifts up, and if the other terminal closes, the gear shifts down. The operation unit 6 can only rotate about 10 degrees from the initial position because the fin shape 25 will come in contact with the operation unit 34. Similarly, the operation unit 34 can also only rotate about 10 degrees in the forward and backward directions from the neutral position because the fin shapes 37 and 38 will come in contact with the operation unit 6 and the brake lever 4.

Though not shown in FIGS. 4 through 6, a bicycle brake operating device, being a mirror image of the first device, is fixed to the other end of the handlebar 1 and can be operated by the left hand.

What is claimed is:

1. A bicycle brake operating device comprising:
   a handlebar bracket;
   a brake lever movably supported on the handlebar bracket for swinging around a first axis of the handlebar bracket;
   an operation unit directly mounted to the brake lever and rotatably supported by the brake lever around a second axis extending in a longitudinal direction of the brake lever, a longitudinal orientation between the operation unit and the brake lever with respect to the longitudinal direction of the brake lever remaining unchanged by rotation of the operation unit; and
   a detection device arranged to detect rotation of the operation unit, the detection device outputting an electrical signal in response to movement of the operation unit, the rotation of the operation unit being centered around the second axis,
   the operating unit being arranged to rotate in two opposite directions from a rest position, with the detection device detecting rotation of the operation unit in both directions.

2. The bicycle brake operating device as recited in claim 1, wherein
   the second axis is located between the brake lever and a handlebar when the handlebar bracket has been fixed to the handlebar and the brake lever is in a standby mode preceding operation.

3. The bicycle brake operating device as recited in claim 2, wherein
   the operation unit is elongated in a longitudinal direction that extends in the longitudinal direction of the brake lever.

4. The bicycle brake operating device as recited in claim 2, wherein
   the operation unit is elongated in a longitudinal direction that extends along the second axis.

5. The bicycle brake operating device as recited in claim 2, wherein
   the operation unit is a gear shift operation unit that is used to operate a gear shifter of a bicycle.

6. The bicycle brake operating device as recited in claim 1, wherein
   the operation unit is elongated in a longitudinal direction that extends in the longitudinal direction of the brake lever.

7. The bicycle brake operating device as recited in claim 1, wherein
   the operation unit is elongated in a longitudinal direction that extends along the second axis.

8. The bicycle brake operating device as recited in claim 1, wherein
   the operation unit is a gear shift operation unit that is used to operate a gear shifter of a bicycle.

9. A bicycle brake operating device comprising:
   a handlebar bracket;
   a brake lever movably supported on the handlebar bracket for swinging around a first axis of the handlebar bracket;
   an operation unit directly mounted to the brake lever and rotatably supported by the brake lever around a second axis forming any angle within 30 degrees with respect to a longitudinal direction of the brake lever, a longitudinal orientation between the operation unit and the brake lever with respect to the longitudinal direction of the brake lever remaining unchanged by rotation of the operation unit; and a detection device arranged to detect rotation of the operation unit, the detection device outputting an electrical signal in response to movement of the operation unit, the rotation of the operation unit being centered around the second axis, the operating unit being arranged to rotate in two opposite directions from a rest position, with the detection device detecting rotation of the operation unit in both directions.

10. The bicycle brake operating device as recited in claim 9, wherein the second axis is located between the brake lever and a handlebar when the handlebar bracket has been fixed to the handlebar and the brake lever is in a standby mode preceding operation.

11. The bicycle brake operating device as recited in claim 10, wherein the operation unit is elongated in a longitudinal direction that extends in the longitudinal direction of the brake lever.

12. The bicycle brake operating device as recited in claim 10, wherein the operation unit is elongated in a longitudinal direction that extends along the second axis.

13. The bicycle brake operating device as recited in claim 10, wherein the operation unit is a gear shift operation unit that is used to operate a gear shifter of a bicycle.

14. The bicycle brake operating device as recited in claim 9, wherein the operation unit is elongated in a longitudinal direction that extends in the longitudinal direction of the brake lever.

15. The bicycle brake operating device as recited in claim 9, wherein the operation unit is elongated in a longitudinal direction that extends along the second axis.

16. The bicycle brake operating device as recited in claim 9, wherein the operation unit is a gear shift operation unit that is used to operate a gear shifter of a bicycle.

* * * * *